No. 827,516. PATENTED JULY 31, 1906.
J. W. EDWARDS.
NEST BOX.
APPLICATION FILED AUG. 28, 1905.
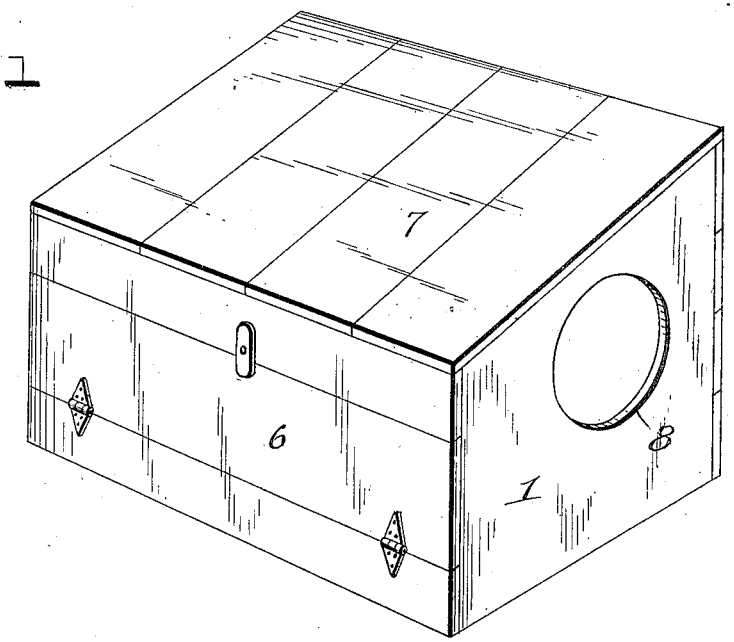
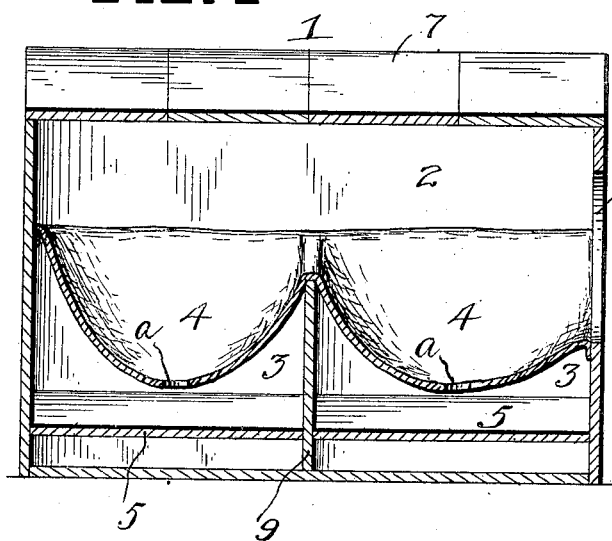
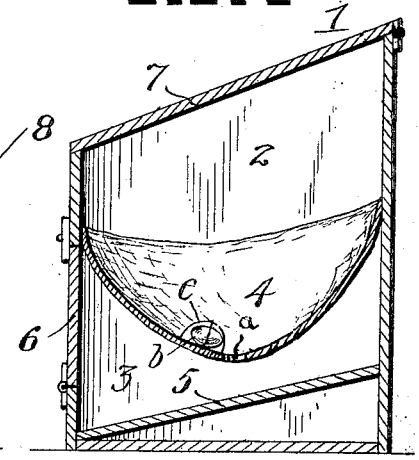
Witnesses
J. W. Griesbauer, Jr.
E. H. Griesbauer.
Inventor
J. W. Edwards
by H. B. Wilson
Attorney

UNITED STATES PATENT OFFICE.

JOHN W. EDWARDS, OF BARBERTON, OHIO.

NEST-BOX.

No. 827,516.  Specification of Letters Patent.  Patented July 31, 1906.

Application filed August 28, 1905. Serial No. 276,109.

*To all whom it may concern:*

Be it known that I, JOHN W. EDWARDS, a citizen of the United States, residing at Barberton, in the county of Summit and State of Ohio, have invented certain new and useful Improvements in Nest-Boxes; and I do declare the following to be a full, clear, and exact description of the invention, such as will enable others skilled in the art to which it appertains to make and use the same.

This invention relates to improvements in nest-boxes for fowls.

The object of the invention is to provide a box of this character having a nest-compartment and an egg-receiving compartment and means whereby the eggs as soon as laid in said nest-compartment will roll into the receiving-compartment, thereby keeping the same clean and protecting them from being broken by the fowls entering the nest-boxes.

With the above and other objects in view the invention consists of certain novel features of construction, combination, and arrangement of parts, as will be hereinafter described and claimed.

In the accompanying drawings, Figure 1 is a perspective view of the box, showing the same closed. Fig. 2 is a vertical longitudinal sectional view of the box, and Fig. 3 is a vertical cross-sectional view of the same.

Referring more particularly to the drawings, 1 denotes a box which may be of any suitable size and shape. In the box 1 is arranged a nest-compartment 2 and an egg-receiving compartment 3.

In the nest-compartment 3 are arranged nests 4, formed of flexible material, preferably oil-cloth, which is arranged in the box to form a seat or pocket, one side of which is lower than the other, as shown. At a point at or near the lowermost portion of said flexible nest is formed an aperture $a$, through which the eggs will roll from the nest to the receiving-compartment 3, arranged beneath said nests.

The bottom or floor 5 of the receiving-compartment is preferably inclined from one side to the other of the box, so that the eggs passing into said compartment will roll toward the side of the box adjacent to the lowest part of the floor, and in said side is formed a door 6, by which access may be had to the receiving-compartment to remove the eggs therefrom.

A nest-egg $b$ may be secured to each of the nests 4 by wire strands $c$, as shown in Fig. 3.

The top 7 of the box is preferably hingedly connected to one side of the box to form a door, by means of which access may be had to the nest-compartment 2, and in one or both ends of the box is formed an entrance-opening 8.

If desired, the box may be provided with one or more partitions 9, which extend part way up the box and separate the nest and egg-receiving compartments into two or more parts, as shown. The upper edge of the partitions form a support for the adjacent sides of the nests. If desired, the upper edge of the partitions may be hollowed or curved downwardly to allow space enough for the fowls to pass from one nest to the other when only one entrance-opening is provided.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A nest-box having arranged therein a nest-compartment and an egg-receiving compartment arranged beneath said nest-compartment, nests arranged in said latter compartment, said nests being formed of a flexible material, arranged and secured to the sides of the box in such a manner as to form a seat having one side lower than the other and having formed therein near the lowermost portion a discharge-aperture whereby an egg laid in said nest will roll through said aperture into the receiving-compartment below, substantially as described.

2. A nest-box having an entrance-opening and having arranged therein a nest-compartment and an egg-receiving compartment, an inclined bottom formed in said latter compartment, a door arranged on the top and a door on the side of said box adjacent to the lowest portion of the egg-receiving compartment, and nests arranged in said nest-compartment, said nests being formed of flexible material secured to the sides of said box to form bag-like seats, which are lower on one side than the other and have formed therein egg-discharge openings whereby an egg laid in said nests will roll through said opening into the compartment below, substantially as described.

In testimony whereof I have hereunto set my hand in presence of two subscribing witnesses.

JOHN W. EDWARDS.

Witnesses:
PAULINE ULMAN,
R. H. HAWKINS.